No. 668,714. Patented Feb. 26, 1901.
F. J. HOFFMAN.
SYSTEM FOR CONTROLLING AND RECORDING SALES, RECEIPTS, &c.
(Application filed May 17, 1899.)
(No Model.) 4 Sheets—Sheet 1.
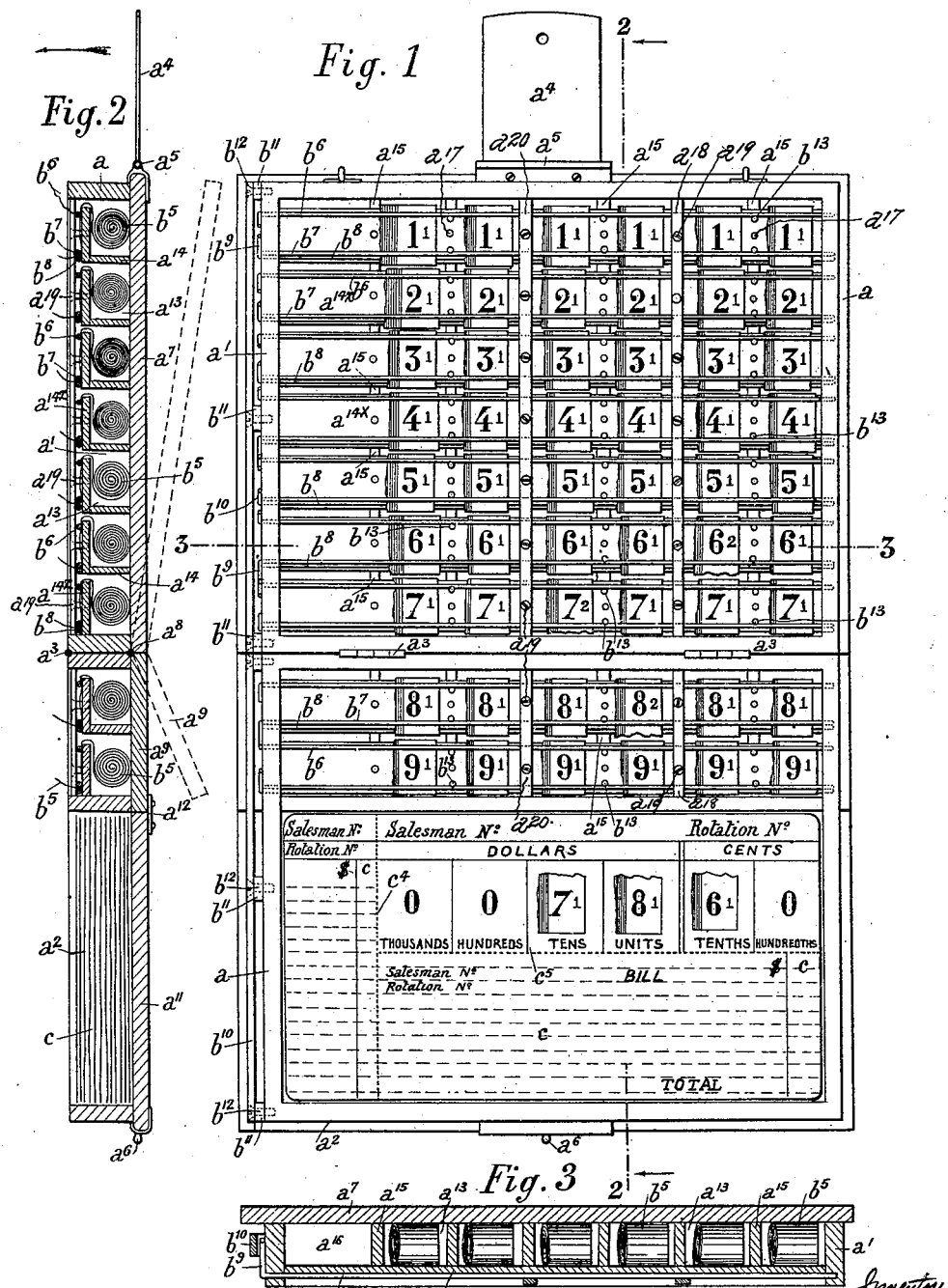

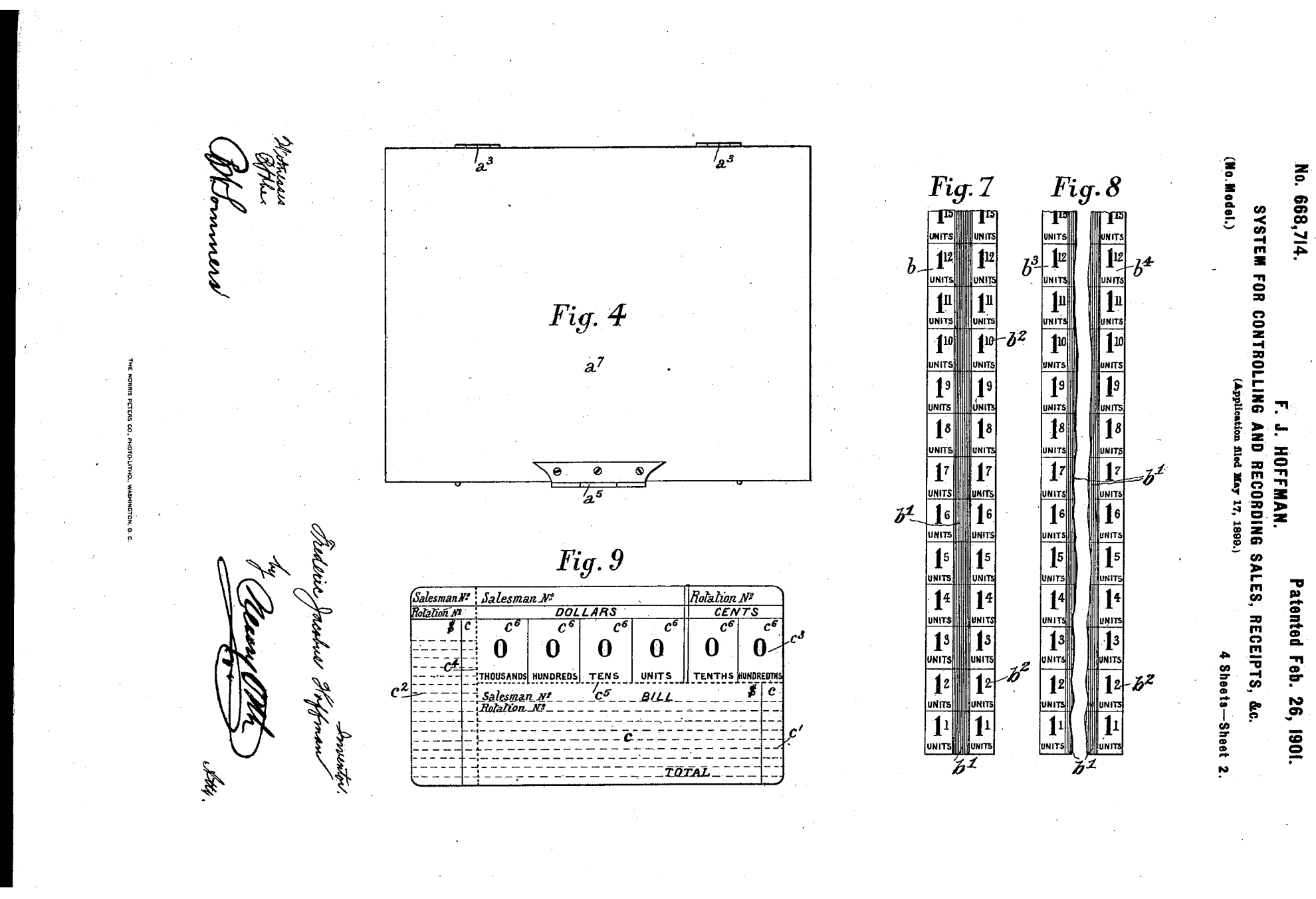

No. 668,714. Patented Feb. 26, 1901.
F. J. HOFFMAN.
SYSTEM FOR CONTROLLING AND RECORDING SALES, RECEIPTS, &c.
(Application filed May 17, 1899.)
(No Model.) 4 Sheets—Sheet 2.

No. 668,714. Patented Feb. 26, 1901.
F. J. HOFFMAN.
SYSTEM FOR CONTROLLING AND RECORDING SALES, RECEIPTS, &c.
(Application filed May 17, 1899.)
(No Model.) 4 Sheets—Sheet 3.
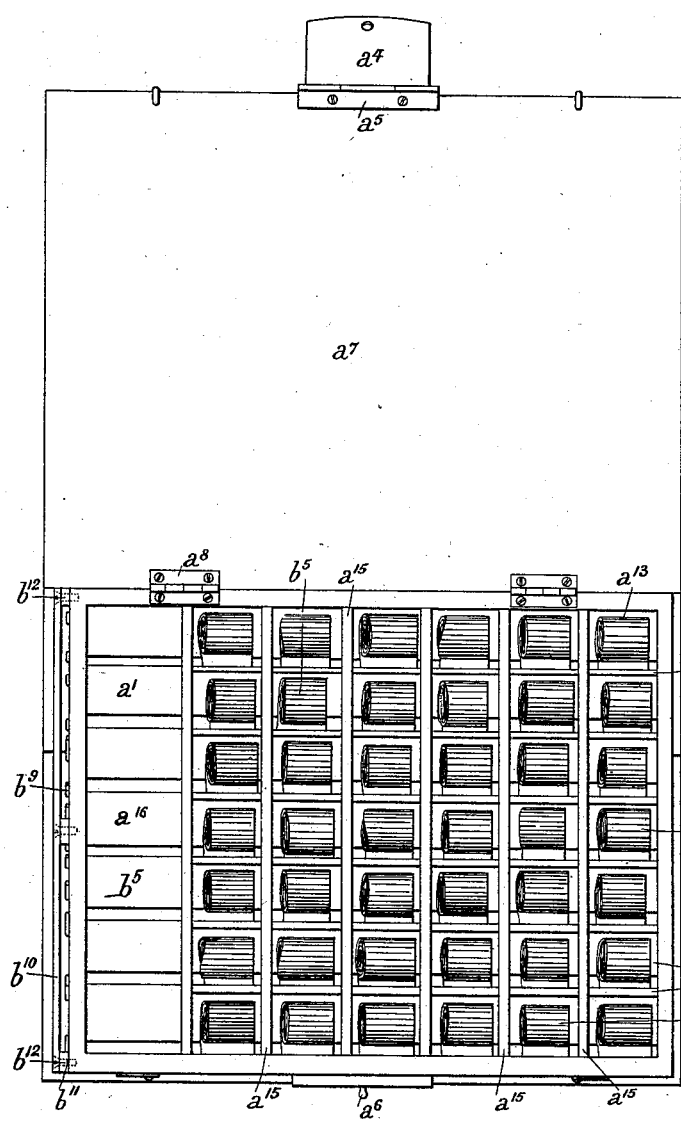
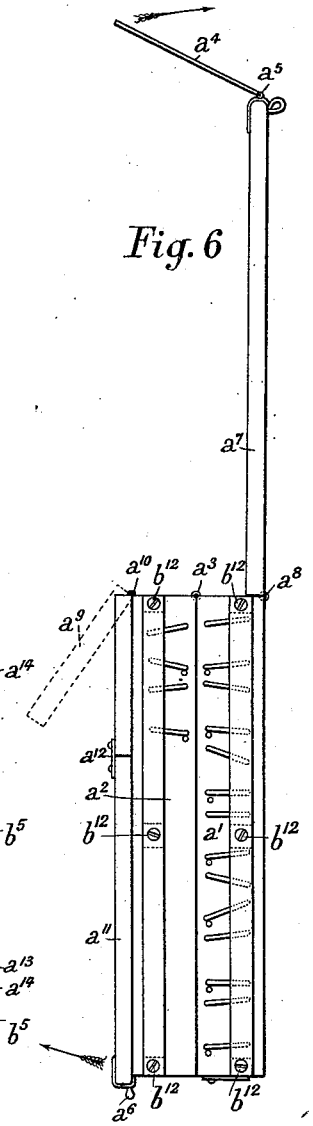

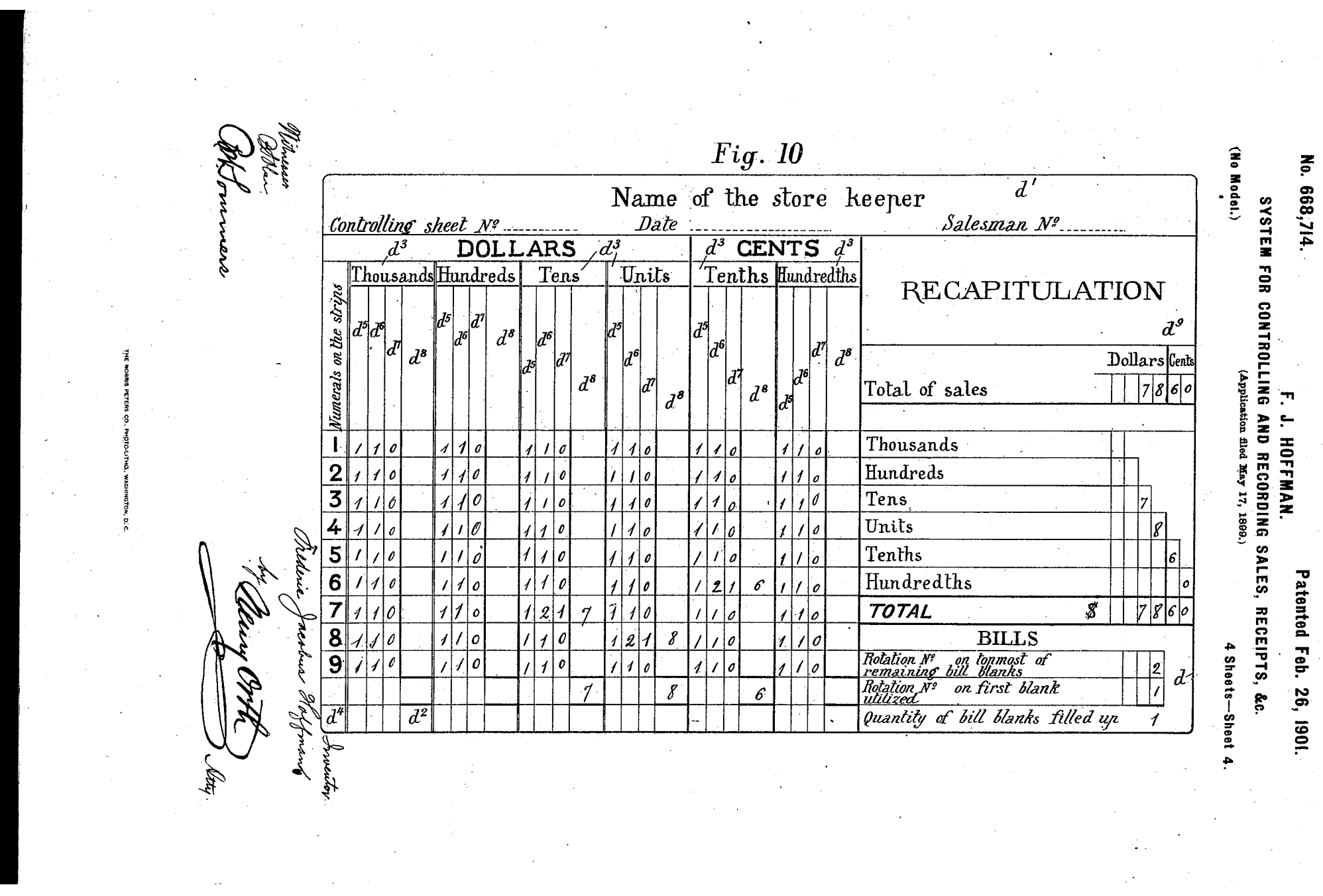

No. 668,714. Patented Feb. 26, 1901.
F. J. HOFFMAN.
SYSTEM FOR CONTROLLING AND RECORDING SALES, RECEIPTS, &c.
(Application filed May 17, 1899.)
(No Model.) 4 Sheets—Sheet 4.

Fig. 10

UNITED STATES PATENT OFFICE.

FREDERIK JACOBUS HOFFMAN, OF BOULOGNE-SUR-SEINE, FRANCE.

SYSTEM FOR CONTROLLING AND RECORDING SALES, RECEIPTS, &c.

SPECIFICATION forming part of Letters Patent No. 668,714, dated February 26, 1901.

Application filed May 17, 1899. Serial No. 717,208. (No model.)

*To all whom it may concern:*

Be it known that I, FREDERIK JACOBUS HOFFMAN, artist, a subject of Her Majesty the Queen of the Netherlands, residing at No. 2 Chaussée du Pont, Boulogne-sur-Seine, France, have invented a certain new and useful Improvement in Systems for Controlling and Recording Sales, Receipts, and Like Operations, (for which I have made application for Letters Patent in France under date of January 18, 1899; in Germany under date of March 25, 1899, and in Belgium under date of March 28, 1899;) and I do hereby declare that the following is a full, clear, and exact description of the same.

My invention consists, broadly speaking, in a system by which it is rendered possible to control and keep an exact record of all operations, such as sales in stores and receipts of moneys. The system is particularly adapted as a means for controlling the sums of money received in the cash-department of a store, while simultaneously affording ready means for controlling and recording the amounts of the sales made by the individual salesmen of the store. The invention is, however, not limited to that special application, because it is also capable of adaptation to all cases generally where it is a question of controlling the delivery or receipt of goods or other articles.

I will describe the invention as applied to the control of moneys received in the cash-department of a store and simultaneously to the recording of the amounts of the sales made by the individual salesmen of the store.

The gist of the invention resides, mainly, in the employment of several series of paper strips placed in a box or case, one box for each salesman of the particular store. Each strip of each series has printed on it a given number, which is repeated as many times as may be desirable—say one hundred times—and these like numbers bear consecutive exponents playing the part of rotation-numbers. Each series comprises nine strips, each bearing repeated thereon a given number and an exponent, as already stated, and each strip has its own number from "1" to "9," inclusive. The series of paper strips may amount to, say, six in number, the first of which applies to hundredths or cents, the second to tenths or dimes, the third to units or dollars, the fourth to tens of units, the fifth to hundreds of units, and the sixth to thousands of units. There is, however, no limit to this number of series. Each strip is preferably formed of a narrow band of paper or equivalent substance wound into a coil and bears, as before mentioned, the repetition of a given numeral, which varies from "1" to "9," inclusive, the said numeral being repeated, say, one hundred times and each numeral having its exponent and an indication of its value.

Let us consider one of the series—say the series of strips belonging to the units. Each of the same is formed of a paper strip, the first of which will bear a repetition of the numeral "1" and an exponent, viz:

| $1^1$ | $1^2$ | $1^3$ | $1^4$ | $1^5$ | $1^6$ |
|---|---|---|---|---|---|
| units | units | units | units | units | units | and so on, the second a repetition of the numeral "2" and an exponent, the third a repetition of the numeral "3" and an exponent, and so on up to the ninth, which will bear the repetition of the numeral "9" and an exponent.

The invention also consists in a box or case in which the series of strips are arranged and grouped.

The invention also consists in a duplicate strip, of which one half is delivered to the salesman for use and the other remains in the hands of a superintendent in charge.

The invention also consists in a bill-blank, which the salesman fills up for each sale.

The invention also consists in a controlling-sheet which the salesman fills up when he is called upon by the proprietor of the store to render an account of the sales effected.

In the accompanying drawings, Figure 1 shows the box or case unfolded ready for use. Fig. 2 is a section of Fig. 1 on the line 2 2. Fig. 3 is a section of Fig. 1 on the line 3 3. Fig. 4 is, as compared with Fig. 1, showing the box unfolded, a plan of the box closed. Fig. 5 is a plan similar to Fig. 4, except that the cover of the box is raised. Fig. 6 is a side view of Fig. 5. Fig. 7 shows one of the strips complete. Fig. 8 shows the same strip severed in two. Fig. 9 shows the salesman's bill-blank. Fig. 10 shows the controlling-sheet.

In the instance illustrated in the accompanying drawings the box or case $a$ is preferably of book form composed of two main portions $a'$ $a^2$, connected by hinges $a^3$ and held together when closed by a clasp or other like fastening $a^4$, hinged at $a^5$ and engaging a hook $a^6$ on the portion $a^2$ of the box. The portion $a'$ is externally closed by a cover $a^7$, hinged at $a^8$, and the portion $a^2$ is partially closed by a cover $a^9$, hinged at $a^{10}$, Fig. 6, and partially by a fixed wall $a^{11}$. A suitable fastening $a^{12}$, secured to the fixed wall $a^{11}$, holds the cover $a^9$ in its closed position. The shape and arrangement of the box shown in the drawings are, however, immaterial. Any other equivalent arrangement may be employed with advantage.

The strip is formed of a ribbon of paper $b$, Fig. 7, long enough to receive a repetition of one given numeral—say one hundred times—arranged in two parallel rows and separated by a close ruling or other marking $b'$. At the foot, or rather at the first one of the numerals 1, is printed the particular designation for which the strip is intended—that is to say, it bears one of the following words: "hundredths," "tenths," "units," "tens," "hundreds," or "thousands," and each numeral is accompanied by an exponent $b^2$, as shown. By way of illustration, the strip $b$ (shown in Fig. 7) is intended to represent units. The strip when so prepared is severed by an irregular cut through the marking $b'$ into two halves $b^3$ $b^4$, Fig. 8, of which one is handed to the salesman for use in the manner hereinafter set forth and the other is kept by a superintendent, who in case of need or suspicion can at all times control the authenticity of the strips either in actual use or already used and disposed of by the different salesmen. Prior to its being severed the duplicate strip may be stamped with the date, a rotation-number, the name, or other conventional sign appertaining to the salesman to whom the one-half of the strip is handed. By keeping an account of the quantity of various strips handed by the superintendent to the salesmen the superintendent can readily calculate and ascertain the amount of sales made within a given time by any particular salesman, taking into account the amounts represented by the strips still contained in the box of the said salesman. The reverse side of the strip $b$—i. e., the opposite side to that which is printed—is gummed for the purpose hereinafter set forth.

A suitable number of strips $b$, each having printed on them their particular designation—viz: first, hundredths, tenths, units, tens, hundreds, or thousands, as the case may be; second, a repeated numeral, and, third, an exponent—are rolled up into a coil of small size $b^5$ and are respectively placed in proper order into small compartments $a^{13}$, Figs. 1, 2, 3, and 5, formed in the portions $a'$ $a^2$ of the box by longitudinal partitions $a^{14}$ and transverse partitions $a^{15}$. In the instance illustrated the box is shown wider than is necessary for the reception of the six series of different rolled-up strips $b^5$, so as to leave a vacant space $a^{16}$ in each horizontal row at the left of the apparatus in Figs. 3 and 5, into which a reserve of strips B may be stored up for use, if desired.

In order to hold the ends of the strips and at the same time to guide them, I provide a set of rods each comprising three rods $b^6$ $b^7$ $b^8$ for each row of strips $b$. Each rod is at one end bent at right angles, so as to form a handle $b^9$, by which the rod can be turned and pulled out when required, while the opposite end engages a hole in the wood, wherein it is supported, as shown in Fig. 3. As shown in the drawings, each strip first passes under the first guide-rod $b^6$ and lies flat against the partition $a^{14\times}$, placed at right angles to the partition $a^{14}$ and on top of the rolls, as shown in Fig. 2, then passes also under the second guide-rod $b^7$ and over the third guide-rod $b^8$, beyond which it projects sufficiently for enabling the salesman to seize it with the fingers, draw it out to the extent of one numeral, and then tear it off, as hereinafter explained.

On that side of the two portions $a'$ $a^2$ of the box whereat the handle $b^9$ projects is provided a ledge $b^{10}$, Figs. 1, 3, 5, and 6, between which and the said portion $a'$ $a^2$ are interposed distance-pieces $b^{11}$ $b^{11}$ $b^{11}$, fastened by means of screws $b^{12}$ or otherwise.

In addition to its being supported at both ends each guide-rod $b^6$, $b^7$, or $b^8$ may be additionally guided by pegs $b^{13}$, driven at suitable intervals into the partitions $a^{14}$, the heads of the said pegs projecting above the guide-rods. The said partitions $a^{14}$ are secured in place by screws $a^{17}$ engaging the vertical partitions $a^{15}$.

The strips corresponding to the units may be separated from those corresponding to the tenths by a vertical bar $a^{18}$, held in place over the guide-rods $b^6$ $b^7$ $b^8$ by screws $a^{19}$ or otherwise. A similar bar $a^{20}$ has been illustrated as separating the strips corresponding to the hundreds from those corresponding to the tens. Any other means may be resorted to for distinguishing the series of strips from each other—as, for instance, by means of colors, each series having its own color.

The bill-blank shown in Fig. 9 is composed after the fashion of any bill as used in stores, except that it is or may be formed of three parts and that one of these parts is of a special design. The bill-blank $c$, a number of which are contained in the portion $a^2$ of the box, (see Figs. 1 and 2,) is formed of a main portion $c'$, Fig. 9, a detachable stub $c^2$, and a detachable controlling-slip $c^3$, the three parts being detached from each other on the perforated lines $c^4$ $c^5$. On each portion are preferably printed the number or name of the salesman and the rotation or consecutive number of the bill-blank as a whole. The salesman writes on the portion $c'$ the designation and price of the goods sold and he repeats them upon the detachable stub $c^2$, which is intended to remain in his charge, while the portion $c'$ is handed to the purchaser after it has been receipted at the cash-department or otherwise. The controlling-slip $c^3$ has likewise printed on it the corresponding designation in respect of salesman and consecutive number, and it is, furthermore, divided into as many divisions $c^6$ as there are series of strips in the apparatus. In each division is printed a zero in some ink soluble in water for the purpose hereinafter explained.

The operation is as follows: Assume that the apparatus has been fitted with the various series of numbered strips and that no number has as yet been detached from any strip. Assume also that the bill-blank $c$ has not been made use of. The salesman on making a sale, the amount of which is supposed to be seventy-eight dollars and sixty cents, writes the nature of the goods and that amount on both portions $c'$ $c^2$, after which he tears off the first number "7" of the strip corresponding to the tens and sticks it, its rear face being gummed, into the corresponding division of the tens. He also tears off the first number "8" of the strip corresponding to the units, also the first number "6" of the strip corresponding to the tenths, and sticks them respectively into their proper divisions. No number requires to be applied to the section for the hundredths, because the amount does not comprise any hundredths, and therefore the zero already printed on the bill-blank will find its use. Fig. 1 shows the respective strips after the first number thereof has been torn off. The bill being now made up is ready to be dealt with. The stub $c^2$ is detached and retained by the salesman. The main portion or bill proper, $c'$, is likewise detached and handed to the purchaser after having been receipted by the cashier, and the remaining slip $c^3$ is retained by the cash, department. The zero in each division $c^6$ of the controlling-slip is preferably printed in some ink soluble in water, as hereinbefore stated, in order to detect fraud. For instance, a cashier after having handed to him the bill shown in Fig. 1 amounting to "$78.60" and after having received that amount might unpaste, say, the number corresponding to the tens, so as to make the bill appear so much less in amount, that fact would be rendered readily visible owing to the color of which the ink is formed being partly, if not entirely, carried away by and adhering to the number removed by the cashier.

The controlling-sheet, which each salesman fills up when called upon by the proprietor of the store to render an account of the sales effected during a given time, is composed of a blank form. (Shown in Fig. 10.) By filling the same up, as hereinafter described, the proprietor is enabled to ascertain at any time not only the amount of the sales effected by the various clerks or in certain departments of his store, but he can also determine exactly the quantity of unused strips still remaining in the hands of each clerk.

The controlling-sheet $d$ contains—say at the top portion $d'$—the name of the storekeeper and blanks intended to be filled up for indicating the number of the sheet, the date, and the number of the salesman. On the left portion $d^2$ it is divided into as many columns $d^3$ as there are series of strips, such columns corresponding in the present instance to the thousands, hundreds, tens, units, tenths, and hundredths, an additional column $d^4$ being provided for the nine numerals from "1" to "9," inclusive. Each column $d^3$ is itself divided up into four different heads $d^5$ $d^6$ $d^7$ $d^8$. In the one $d^5$ the salesman writes the rotation-number which appears on the strip at the time he begins operations; in the one $d^6$ he writes the rotation-number which appears on the strip at the time he is making up his account; in the one $d^7$ he writes a number corresponding to the quantity of numbers utilized in the strip, and in the one $d^8$ he writes the respective totals. On the right portion $d^9$ it is likewise divided up for the purpose of containing a recapitulation, as shown.

Assuming a salesman to be called upon to give an account of the sales effected by him at the time the apparatus has been employed to the extent described so far—viz., at the time the sales amount to seventy-eight dollars and sixty cents—he will fill out the controlling-sheet in the following manner: In the first place, he will put a number to the sheet, the date, and his own number or other like designation, after which he will proceed to fill out the various columns $d^3$. In the head $d^5$ of column $d^3$ for the thousands he will write (on a line with the numeral "1," which designates the number printed on the strip for the thousands) the exponent-number which appears on the strip for the said thousands—viz., "1"—and likewise with reference to the remaining numerals "2," "3," "4," "5," "6," "7," "8," and "9." As none of these strips have been utilized the exponents on each will be the numeral "1." (See Fig. 1.) The salesman will consequently write that numeral throughout the said head $d^5$ for the thousands-column $d^3$. He will next fill out the head $d^6$ of the said thousands-column $d^3$, such head being intended, as hereinbefore stated, to contain the rotation-number appearing at the time on the various strips for the thousands. As none of these strips have been utilized the rotation-numbers will be the same as for head $d^5$, and the salesman will consequently write the same numeral "1" throughout the said head $d^6$ for the thousands. He will then fill out the head $d^7$ of the same column $d^3$, such head being intended, as hereinbefore stated, to contain the number corresponding to the quantity of numbers torn off from the strips. As no number has been torn off any of the strips for the thousands the salesman will write "zero," after which he will proceed to write down the total, which evidently will be *nil*. He will afterward proceed to similarly fill out the remaining heads $d^5$ $d^6$ $d^7$ $d^8$ for the columns $d^3$, corresponding to the hundreds, tens, units, tenths, and hundredths, the operation being rendered readily apparent from the drawings, whereby it will be seen that the controlling-sheet will show sales to the amount of "$78.60." The salesman finally proceeds to fill out the right portion $d^9$ of the sheet, as will be readily understood on examining such portion, and the controlling-sheet $d$ being completely filled up is now handed to the storekeeper.

Having now set forth the nature of my invention and the best means I am acquainted with for carrying the same into effect, I wish it to be distinctly understood that I do not limit myself to the precise details herein described, and illustrated in the accompanying drawings, because they may vary considerably without departing from the spirit of the invention. For instance, as regards the bill-blank $c$ and the controlling-sheet $d$ both may be modified to suit particular conditions or circumstances, and yet answer the purpose herein contemplated to be met. Again, the apparatus itself may vary as to arrangement and construction, especially as regards the means for containing and guiding the strips, and yet still retain the characteristic features of my invention.

I claim—

1. In a system for recording and controlling sales, receipts, deliveries and like operations, the combination with a series of salesman's strips having one irregular edge, of a similar series of superintendent's strips having corresponding irregular edges each of said strips bearing a single numeral repeated, a decimal designation as units and multiples thereof and a consecutive exponent, and a salesman's bill-blank intended to receive numerals severed from said salesman's strips for the purpose of combining the single numerals so as to represent numeric values, substantially as described.

2. In a system for recording and controlling sales, receipts, deliveries and like operations, the combination with a series of salesman's strips having one irregular edge, of a similar series of superintendent's strips having corresponding irregular edges each of said strips having a single numeral repeated and a consecutive exponent, said strips being differentiated from each other by colors, and a salesman's bill-blank intended to receive numerals severed from the said salesman's strips for the purpose of combining the single figures so as to represent numeric values, substantially as described.

3. In a system for recording and controlling sales, receipts, deliveries and like operations, consisting of a series of strips each of which bears a single numeral repeated, said numerals having consecutive exponents, in combination with a salesman's bill-blank having a separable portion adapted to receive numerals severed from said strips and divided into as many divisions as there are strips, substantially as and for the purpose specified.

4. In a system for controlling and recording sales, receipts, deliveries and like operations, the combination with a series of gummed strips, each of which bears on the ungummed face a single numeral repeated, said numerals having consecutive exponents, the said strips being differentiated from each other by different colors, of a salesman's bill-blank having a separable portion containing divisions intended to receive numerals severed from said strip, substantially as and for the purpose set forth.

5. In a system for controlling and recording sales, receipts, deliveries and like operations, the combination with a series of strips, each of which bears a single numeral repeated, each numeral having a decimal designation as units and multiples or submultiples thereof and a consecutive exponent, of a salesman's bill-blank having a separable portion containing divisions intended to receive numerals severed from said strips, the divisions of said blank having marked thereon a zero in some ink soluble in water, substantially as and for the purpose set forth.

6. In a system for controlling and recording sales, receipts, deliveries and like operations, the combination with a series of strips, each of which bears a single numeral repeated, said numerals having consecutive exponents, the said strips being differentiated from each other by different colors, of a salesman's bill-blank having a separable portion containing divisions intended to receive numerals severed from said strips, the divisions of the blank having marked thereon a zero in some ink soluble in water, substantially as and for the purpose set forth.

In witness whereof I have hereunto set my hand in presence of two subscribing witnesses.

FREDERIK JACOBUS HOFFMAN.

Witnesses:
R. H. BRANDON,
EDWARD P. MACLEAN.